March 24, 1931.  R. S. M. MITCHELL  1,797,875
SHOCK ABSORBER
Filed Feb. 2, 1929
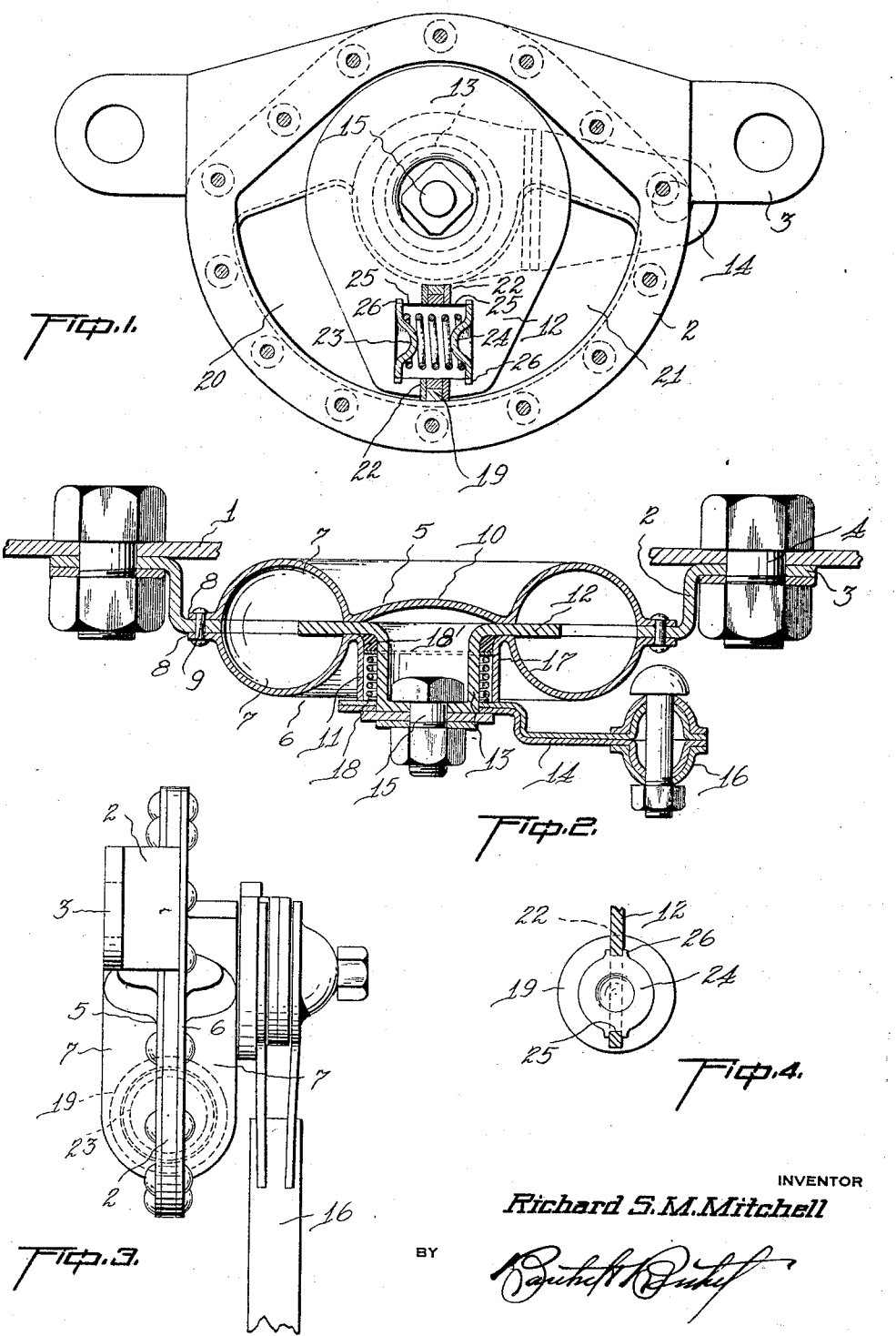
INVENTOR
Richard S. M. Mitchell
BY
ATTORNEYS Patented Mar. 24, 1931

1,797,875

UNITED STATES PATENT OFFICE

RICHARD S. M. MITCHELL, OF DETROIT, MICHIGAN, ASSIGNOR TO WILLIAM H. WILSON, OF DETROIT, MICHIGAN

SHOCK ABSORBER

Application filed February 2, 1929. Serial No. 336,982.

The present invention pertains to a novel shock absorber designed for application to vehicles such as automobiles, trucks and the like, having particular reference to that type of hydraulic shock absorber disclosed in my Patent No. 1,454,132.

The principal object of the present invention is to construct a shock absorber which will offer no resistance or interference to movement of the vehicle springs and chassis in relation to each other during normal or smooth riding of the vehicle. In response to a shock, a movable part contained in a fluid chamber, forces the fluid through a restricted, dual valve controlled passage in said movable part. On a sudden or excessive shock the valve controlled opening is entirely closed and the movable part is cushioned by the fluid which is contained in the chamber, the chamber being constructed in the nature of a diaphragm to allow relief to excess pressure caused by such movement of the movable part. The diaphragm is constructed to withstand a certain, definitely calculated pressure and thereby permit relief of any excessive pressure to prevent the movable part from completely stopping movement of the springs in relation to the chassis in reference to a shock on the vehicle when an exceedingly severe shock is imparted to the vehicle.

Another object of the present invention is to provide a simple device of this character whose operation is based upon the velocity of approach and recession of the axle and chassis in relation to each other and determining a velocity which will not be exceeded. The device attains the highest possible degree of simplicity and is ingeniously designed to permit the entire device to be formed by punch press operation which obviously decreases the cost of manufacture and increases the desirability as an article for manufacture.

With these objects in view, and others which are subsidiary thereto or resultant therefrom and which will later become apparent, my invention is fully disclosed by way of example in the following description, reference being had to the accompanying drawings, in which Figure 1 illustrates the shock absorber with half of the casing removed and showing the valve mechanism partly in cross section;

Figure 2 is a transverse cross section through the shock absorber and the supporting member;

Figure 3 is a side elevation of the shock absorber; and

Figure 4 is a cross sectional view through the vane disc and illustrating the manner of supporting the valve mechanism.

Reference to these views will now be made by use of like characters which are employed to designate corresponding parts throughout.

To the frame 1 of an automobile or other vehicle is secured a bracket 2 having ears 3 through which bolts 4 may be passed into the frame. A two part casing is supported by the bracket 2 and is comprised of the rear section 5 and the front section 6. Each section is provided with a curved semi-circular enlargement 7 and the flanges 8 through which the bolts or rivets 9 may be passed into the bracket 2 for supporting the casing. The section 5 is provided with a diaphragm 10 formed integral with the enlargement 7 and the section 6 is provided with a sleeve 11, the two combining to pivotally support a vane disc 12.

The vane disc 12 is formed with a circular boss 13 which is adapted to extend through the sleeve 11 and an arm 14 is secured to the boss 13 by a bolt 15 having suitable lockwashers. A connecting rod 16 is attached to the arm 14 at one end and has its opposite end attached to the axle of the vehicle and provides a suitable linkage whereby movement of the frame relative to the axle of the vehicle imparts rotary movement to the vane disc 12.

The contour of the vane disc 12 is clearly illustrated in Figure 1 of the drawings as well as the curvature of the enlargements 7 which combine to form a circular chamber in which the vane portion of the disc 12 is free to move in an arc supported by the washer 17 which encircles the boss 13 and snugly fits in the sleeve 11. A compressed spring 18 exerts pressure against the arm 14 and against the washer 17 to force the packing material 18' tightly against the vane disc 12 to prevent the fluid, which is contained in the chamber formed by the enlargements 7, from escaping through the sleeve 11.

A piston 19, formed of a bull ring and soft packing material, is carried by the vane disc 12 and is constructed to completely close the annular chamber formed by the enlargements 7, dividing it into the two chambers 20 and 21 respectively which are filled with a fluid such as oil. For supporting the piston, the vane disc 12 is radially slotted as at 22 to engage the sides of the piston whereby movement of the connecting arm 16 causes the piston to be moved to lessen the volume of one of the chambers 20 or 21 and increase the volume of the other.

To permit movement of the disc a valve mechanism is provided in conjunction with a central opening in the piston 19 which valve comprises two discs 23 and 24, supported in the recesses 25 in the vane disc 12, the recesses, as clearly illustrated in Figure 1, being formed in the slot 22. Each disc is circular except for the ears 26 which are adapted to extend beyond the edges of the recesses 25, see Figure 4, to slidably support the discs in the vane disc 12. Each disc is struck upwardly in the center to form a raised portion adapted to center a compressed spring 27 which normally maintains the discs in the position illustrated in Figure 1 of the drawing which is the open position and permitting them to move in a manner to close the control opening in the piston if sufficient pressure is exerted upon the discs to overcome the spring pressure.

In operation, a deflection of the weight carrying the spring of the vehicle (not shown) causes the connecting rod 16 to swing the arm 14 and cause the vane disc 12 to be rotated. Rotation of the vane disc, in a clockwise direction for example, causes the fluid in the chamber 20 to be compressed and forced through the central opening in the piston 19 to fill the chamber 21. If the movement is of such velocity that the oil cannot pass into the chamber 21 with sufficient rapidity, owing to the lack of sufficient area of the opening in the piston 19, the disc 23 will be moved by the oil pressure so that it entirely closes the opening. When the opening is entirely closed in this manner, the excess pressure is expended in deflecting the diaphragm 10 which permits the fluid to pass between the section 5 and the vane disc 12 to fill the vacuum created by the above described movement in the chamber 21 with the compressed fluid from the chamber 20.

The energy stored in the spring suspension of a given automobile is directly proportional to the square of the velocity, since the work done is ascertained by the equation $$\text{work} = \frac{\text{mass} \times \text{velocity}^2}{2}$$

The weight and gravity are both constant for any given case and therefore the only variation in the work is caused by variation of $V^2$ (velocity$^2$). For the present illustration let it be understood that the spring 27 is set at $M_1$ which permits the piston 19 to move through the fluid freely at any rate up to $M_1$ without causing one of the valves 23 or 24 to close. Therefore if $M_1$ be the limit over which the valves 23 and 24 are caused to operate and close the piston, then when $V_1$ in the equation $$M_1 = \frac{WV_1^2}{2G}$$

is exceeded, the valve 23 or 24 as the case may be, will be closed and the energy $$M = \frac{WV^2}{2G}$$

which is the shock, is absorbed in deflecting the diaphragm to force the oil from the compression chamber into vacuum side of the piston. The instant the velocity $V_1$ is established through the relief thus afforded, the valve 23 or 24 opens and the vehicle spring is permitted to take the entire load.

Although a specific embodiment of my invention has been illustrated and described, it is to be understood that various alterations may be made in the details of construction without departing from the spirit of the invention as defined by the following claims.

What I claim is:—

1. A shock absorber having a sectional casing forming a curved circular chamber adapted to contain a quantity of fluid, a diaphragm formed in said casing, a vane disc in said casing adapted to be rotated by the approach or recession of the vehicle axle and frame upon flexure of the load carrying spring, means on said vane disc adapted for movement through the fluid in said chamber, and means carried by said first named means and operable at a certain velocity of the rotation of said vane disc whereby pressure exerted upon said member by the velocity of the movement of said spring is expended in compressing said fluid in said chamber, said diaphragm being deflected by the compression of said fluid whereby to relieve said pressure and permit said second named means to resume a normal position.

2. In a shock absorber having a sectional casing, a diaphragm formed on one of said sections of said casing, curved semicircular enlargements formed on each section of said sectional casing combining to form a curved circular chamber adapted to contain a quantity of fluid, a vane disc rotatably supported by said sections of said casing, and means carried by said vane for dividing said circular chamber into two sections, said diaphragm being adapted for deflection to afford communication between the two sections of said divided chamber.

3. In a shock absorber having a sectional casing, a diaphragm formed on one of said sections of said casing, curved semicircular enlargements formed on each section of said sectional casing and combining to form a curved circular chamber adapted to contain a quantity of fluid, a vane disc rotatably supported by said sections of said casing, a piston mounted on said vane disc and adapted to divide said circular chamber into two sections, and a valve mechanism in said piston to permit fluid to pass through said piston under normal conditions, said diaphragm being adapted for deflection under abnormal conditions to permit the fluid to flow from one section of said chamber to the other.

4. In a shock absorber having a sectional casing, a diaphragm formed on one of said sections of said casing, curved semicircular enlargements formed on each section of said sectional casing and combining to form a curved circular chamber adapted to contain a quantity of fluid, a vane disc rotatably mounted between said sections of said casing, a piston mounted on said vane disc and adapted to divide said circular chamber into two sections, a valve mechanism in said piston to permit fluid to pass through said piston under normal conditions, and means carried by said valve mechanism for determining the pressure required to operate said valve mechanism, said diaphragm being adapted for deflection to permit relief of pressure in one section of said chamber into the other section when said valve mechanism is closed.

5. A shock absorber comprising a casing forming a curved circular chamber adapted to contain a quantity of fluid, a vane disc rotatably mounted in said body and adapted to be rotated by approach or recession of the vehicle spring in relation to the body, a piston carried by said vane disc and dividing said chamber, and an expansion diaphragm formed integral with said body for relieving the fluid pressure on one side of said piston by admitting the oil to the chamber on the other side of said piston.

6. A shock absorber comprising a body forming a curved circular chamber adapted to contain a quantity of fluid, a vane disc rotatably mounted in said body and adapted to be rotated by approach or recession of the vehicle spring in relation to the body, a piston carried by said vane disc and dividing said chamber, a valve controlled opening in said piston, said valve being of a nature which permits the piston to move through the fluid at a certain predetermined velocity, means for permitting said valve to close when said piston is moved at a rate higher than said predetermined velocity, and a diaphragm provided in said casing for relieving the fluid pressure on one side of said closed piston by admitting the fluid to the chamber on the other side of said piston.

7. A shock absorber comprising a body forming a curved circular chamber adapted to contain a quantity of oil, a vane disc rotatably mounted in said body and adapted to be rotated by approach or recession of the vehicle spring in relation to the body, a piston carried by said vane disc and dividing said chamber, a valve controlled opening in said piston, said valve controlling said piston being of a nature which permits the piston to move through the oil at a certain predetermined velocity, means for permitting said valve to close when said piston is moved at a rate higher than said predetermined velocity, and means provided in said casing for relieving the oil pressure on one side of said closed piston by admitting the oil to the chamber on the other side of said piston, said means comprising a diaphragm adapted to be deflected by said oil pressure.

8. A shock absorber for vehicles, comprising two concentric members, connecting means between one of said members and the vehicle frame, and connecting means between the other of said concentric members and the vehicle axle, said connecting means being so arranged that a movement of the axle relative to the vehicle frame produces relative rotative movement of the concentric members, a sectional cylinder of the form of a sector having one of the sections formed into a diaphragm borne by one of said concentric members and adapted to contain a quantity of fluid, and a piston in said cylinder attached to the other of said concentric members.

9. A shock absorber for vehicles, comprising two concentric members, connecting means between one of said members and the vehicle frame, and connecting means between the other of said concentric members and the vehicle axle, said connecting means being so arranged that a movement of the axle relative to the vehicle frame produces relative rotative movement of the concentric members, a sectional cylinder of the form of a section of a circle having one of the sections formed into a diaphragm borne by one of said concentric members and adapted to contain a quantity of fluid, a piston in said cylinder attached to the other of said concentric members, and a valve mechanism in said piston adapted to operate at a certain rate of rotative movement of the concentric members.

10. In a shock absorber, two concentric relatively rotatable members, a cylinder of sector form borne by one of said members and adapted to contain a quantity of fluid, a piston in said cylinder attached to the other of said members, a valve controlled passage in said piston to permit said fluid to pass from the part of the cylinder at one side of the piston to the part of the cylinder at the other side of the piston, said valve being so arranged that flow of the fluid through said passage tends to close it, and a diaphragm formed in one of said concentric members for relieving the fluid pressure when said valve in said piston is closed.

In testimony whereof I affix my signature.

RICHARD S. M. MITCHELL.